United States Patent
Ura (10) Patent No.: US 10,872,107 B2
(45) Date of Patent: Dec. 22, 2020

(54) DOCUMENT SEARCH SYSTEM FOR SPECIALIZED TECHNICAL DOCUMENTS

(71) Applicant: Keysight Technologies, Inc., Minneapolis, MN (US)

(72) Inventor: Tomonori Ura, Tokyo (JP)

(73) Assignee: Keysight Technologies, Inc., Santa Rosa, CA (US)

( * ) Notice: Subject to any disclaimer, the term of this patent is extended or adjusted under 35 U.S.C. 154(b) by 570 days.

(21) Appl. No.: 15/640,122

(22) Filed: Jun. 30, 2017

(65) Prior Publication Data

US 2019/0005052 A1    Jan. 3, 2019

(51) Int. Cl.
| | | |
|---|---|---|
| *G06F 17/30* | (2006.01) | |
| *G06F 16/35* | (2019.01) | |
| *G06N 5/02* | (2006.01) | |
| *G06F 16/93* | (2019.01) | |
| *G06F 16/901* | (2019.01) | |
| *G06N 20/00* | (2019.01) | |

(52) U.S. Cl.
CPC .......... *G06F 16/355* (2019.01); *G06F 16/358* (2019.01); *G06F 16/9024* (2019.01); *G06F 16/93* (2019.01); *G06N 5/02* (2013.01); *G06N 5/022* (2013.01); *G06N 20/00* (2019.01)

(58) Field of Classification Search
CPC ...... G06F 16/355; G06F 16/358; G06F 16/93; G06F 16/9024; G06N 20/00; G06N 5/02; G06N 5/022
See application file for complete search history.

(56) References Cited

U.S. PATENT DOCUMENTS

| | | | |
|---|---|---|---|
| 6,675,159 B1* | 1/2004 | Lin ....................... | G06F 40/253 |
| 9,110,985 B2* | 8/2015 | Boscolo ................ | G06F 16/367 |
| 2004/0024739 A1* | 2/2004 | Copperman .......... | G06F 16/353 |
| 2006/0015486 A1* | 1/2006 | Nomiyama ............ | G06F 16/33 |
| 2010/0076984 A1* | 3/2010 | Papadopoullos ... | G06F 16/3322 |
| | | | 707/749 |

(Continued)

FOREIGN PATENT DOCUMENTS

| | | |
|---|---|---|
| EP | 1939797 A1 | 7/2008 |
| JP | 4620721 | 11/2010 |

OTHER PUBLICATIONS

Scaiella, et al., Topical Clustering of Search Results, WSDM'12, Feb. 8-12, 2012, Seattle, Washington, USA.

(Continued)

*Primary Examiner* — Huawen A Peng (57) ABSTRACT

A method for operating a data processing system to identify documents in a library includes a plurality of documents and a plurality of concepts exemplified by the plurality of documents and computer readable media that stores instructions for causing a data processing system to execute that method are disclosed. The method includes causing the data processing system to identify candidate documents matching a user provided search keyword from the library, causing the data processing system to generate a topical graph relating concepts contained in the candidate documents to one another, and clustering the candidate documents based on the topical graph. For each cluster, the data processing system displays a summary of the candidate documents in that cluster together with a cluster name that characterizes that cluster.

17 Claims, 10 Drawing Sheets

(56) References Cited

U.S. PATENT DOCUMENTS

| | | | |
|---|---|---|---|
| 2012/0016877 A1 | 1/2012 | Vadrevu | |
| 2012/0185466 A1* | 7/2012 | Yamasaki | G06F 16/3338 |
| | | | 707/722 |
| 2016/0342681 A1* | 11/2016 | Kesin | G06F 16/334 |
| 2017/0076151 A1* | 3/2017 | Roy | G06K 9/6282 |
| 2017/0228239 A1* | 8/2017 | Elassaad | G06F 16/9536 |
| 2017/0235848 A1* | 8/2017 | Van Dusen | G06F 16/904 |
| | | | 705/12 |

OTHER PUBLICATIONS

Stefanowski, et al., Carrot² and Language Properties in Web Search Results Clustering, AWIC'03 Proceedings of the First International Atlantic Web Intelligence Conference on Advances in Web Intelligence, May 5, 2003, pp. 240-249, Madrid, Spain.

Milne, et al., An Effective, Low-Cost Measure of Semantic Relatedness Obtain from Wikipedia Links, Association for the Advancement of Artificial Intelligence, 2008, pp. 25-30.

Ferragina, et al., Fast and Accurate Annotation of Short Texts with Wikipedia Pages, IEEE Software, vol. 29, Issue 1, Jan. 2012, pp. 70-75, Los Alamitos, CA.

Keysight Technologies, Inc., B1500A Semiconductor Device Analyzer Data Sheet, Feb. 25, 2016.

Lowe, Object Recognition from Local Scale-Invariant Features, ICCV '99 Proceedings of the International Conference on Computer Vision, vol. 2, Sep. 20, 1999, Washington, DC.

\* cited by examiner

DOCUMENT SEARCH SYSTEM FOR SPECIALIZED TECHNICAL DOCUMENTS

BACKGROUND

Improvements in measurement systems have resulted in systems that include software based controllers that can operate the underlying measurement apparatus to perform an ever increasing list of specific measurements. The shear size of this list makes selecting a measurement protocol from a list unattractive. Schemes based on narrowing the list using keyword searches have also had limited success, as the search requires a user to have an operational skill level for the specific instrument. Many users lack the operational skill level in question. In addition, the functional definitions used in different measurement apparatuses for the same or similar functions can differ from apparatus to apparatus depending on the model, installed software, or type of license that was purchased with the apparatus.

Attempts to mitigate this search problem by using the onboard data processing systems that are included in many modern instruments have met with limited success. These search engines typically search a database of measurement protocols that includes descriptive text for each measurement protocol. The search engines require the user to enter one or more keywords and select all protocols that satisfy the keyword search for display to the user. The user must then scroll through the list and select candidate protocols for a detailed review of the descriptive text. Again, the user must be familiar with the lexicon of the documents. If the user selects a keyword that is overly broad, the list becomes excessive. If the user selects too narrow a keyword, the desired protocol may be missed.

SUMMARY

The present invention includes a method for operating a data processing system to identify documents in a library which includes a plurality of documents and a plurality of concepts exemplified by the plurality of documents and computer readable media that stores instructions for causing a data processing system to execute that method. The method includes causing the data processing system to identify candidate documents matching a user provided search keyword from the library, causing the data processing system to generate a topical graph relating concepts contained in the candidate documents to one another, and clustering the candidate documents based on the topical graph. For each cluster, the data processing system displays a summary of the candidate documents in that cluster together with a cluster name that characterizes that cluster.

In one aspect of the invention, the method causes the data processing system to generate a text index specifying a location in each of the plurality of documents of each candidate search keyword in the library.

In another aspect, the method causes the data processing system to generate a concept index specifying a location for each concept in the plurality of documents and a relationship between that concept and another one of the concepts in the plurality of documents.

In another aspect, the concept index includes a weight specifying the strength of the relationship between that document and the another one of the concepts.

In another aspect, the relationships comprise a parent-child, generic concept-specific concept, a concept that is part-of or an attribute-of another concept, a concept that is a synonym for another concept, whole and part of the whole, and a problem and solution relationship.

In another aspect, the relationships comprise a concept keyword relationship associating a concept keyword in one of the documents with one of the concepts.

In another aspect, each of the concepts in the topical graph includes a concept name describing that concept and wherein the cluster name is the concept name of one of the concepts included in the candidate documents in the cluster.

In another aspect, the concept index is derived from an ontology knowledge database.

In another aspect, the concept name for one of the clusters includes a name of a parent concept common to two of the concepts within that one of the clusters. In another aspect, the concept name for one of the clusters includes a name of a parent concept common to a majority of the concepts within that one of the clusters. In another aspect, the concept name is a name common to all concepts in one of the clusters.

In another aspect, the method includes receiving one of the cluster names from the user and another search keyword and causing the data processing system to generate candidate documents representing one of the plurality of documents belonging to that one of the cluster names and previously selected documents.

In another aspect, each concept in the topical graph includes a list of concept keywords associated with that concept, and the data processing system displays the concept keywords associated with the concept corresponding to the cluster name when the summary of the candidate documents is displayed.

In another aspect, the data processing system performs another search of the documents using one of the displayed concept keywords in addition to the search keyword in response to a user selecting one of the concept keywords.

The invention also includes a computer readable medium having instructions that cause a data processing system to execute a search method discussed above when the instructions are loaded into a processor on the data processing system.

In another aspect, the computer readable medium also stores an ontology database that is used by the data processing system to generate the topical graph from the library. In another aspect, the library is separate from the computer readable medium.

DETAILED DESCRIPTION

In one embodiment of the present invention, the present invention includes a search engine that searches a collection of documents relating to a measurement instrument on which the library and documents are stored. The present invention overcomes the above-described problems by utilizing two databases in searching a collection of documents for topics described by keywords or phrases. The first database is an index of the terms in the collection of documents. This database links the terms to the specific documents in which the terms appear and the locations in those terms in the documents.

The second database will be referred to as an ontology knowledge database. The ontology knowledge database associates concepts in the particular field to which the documents relate, and includes a list of where each concept occurs in the documents in the library. In one aspect of the invention, each concept is represented by a node in a graph. Each node is connected to other nodes in the graph by various edges that represent relationships. Each relationship is characterized by a type and weight. The relationships include parent-child relationships, genus-species relationships, problem-solution relationships, etc. The ontology knowledge database is provided by the entity that provides the collection of documents. The weights associated with the relationships are adjusted to optimize the searches. Each node is characterized by a short name or title that conveys the concept to the user.

In addition to relationships with other concepts, a concept is characterized by keywords or phrases that occur in the documents in the library. The locations of a concept in the library is assigned to the location of these keywords and/or phrases. The keywords or phrases that are associated with a concept will be referred to as concept keywords to distinguish these keywords and phrases from keywords or terms used to search the documents in a keyword search. These later keywords will be referred to as just keywords or terms unless the context requires more precision; in which case, these keywords will be referred to as search keywords or search terms in the following discussion. It should also be noted that some concepts may not have any concept keywords associated directly with the concept. For example consider two concepts that are related by a parent-child relationship. The child concept has concept keywords directly associated with that concept. However, the parent may not have any concept keywords directly associated with it.

In one aspect of the invention, the relationship between a concept and a concept keyword associated with that concept is also represented by an edge having a weight. Hence, the parent concept discussed above is connected to a concept keyword of the child by a path that has a combined weight, which will be less than that of the child-concept keyword relationship. The concept-concept keyword relationship is one of the relationships stored in the ontology knowledge database. In another aspect of the invention, the location of each concept keyword in each of the documents in the library is also stored in the ontology database.

Given a query against the first database, the second database is used to group the resulting documents. Each group relates to a specific concept. Any particular document could be in multiple groups. A name is assigned to each group that reflects the basic concept of the group. Search results are then provided to the user one group at a time together with the name of each group to facilitate the user's search for the desired document(s). This allows the user to focus on groups that are more likely to contain the desired documents without serially inspecting the entire list of documents from the query. Since the user can more efficiently view the results of the first database, a larger number of "hits" can be tolerated, and hence, the user can use a broader query without being overloaded by the task of reviewing the resulting documents one at a time.

Figure 1:
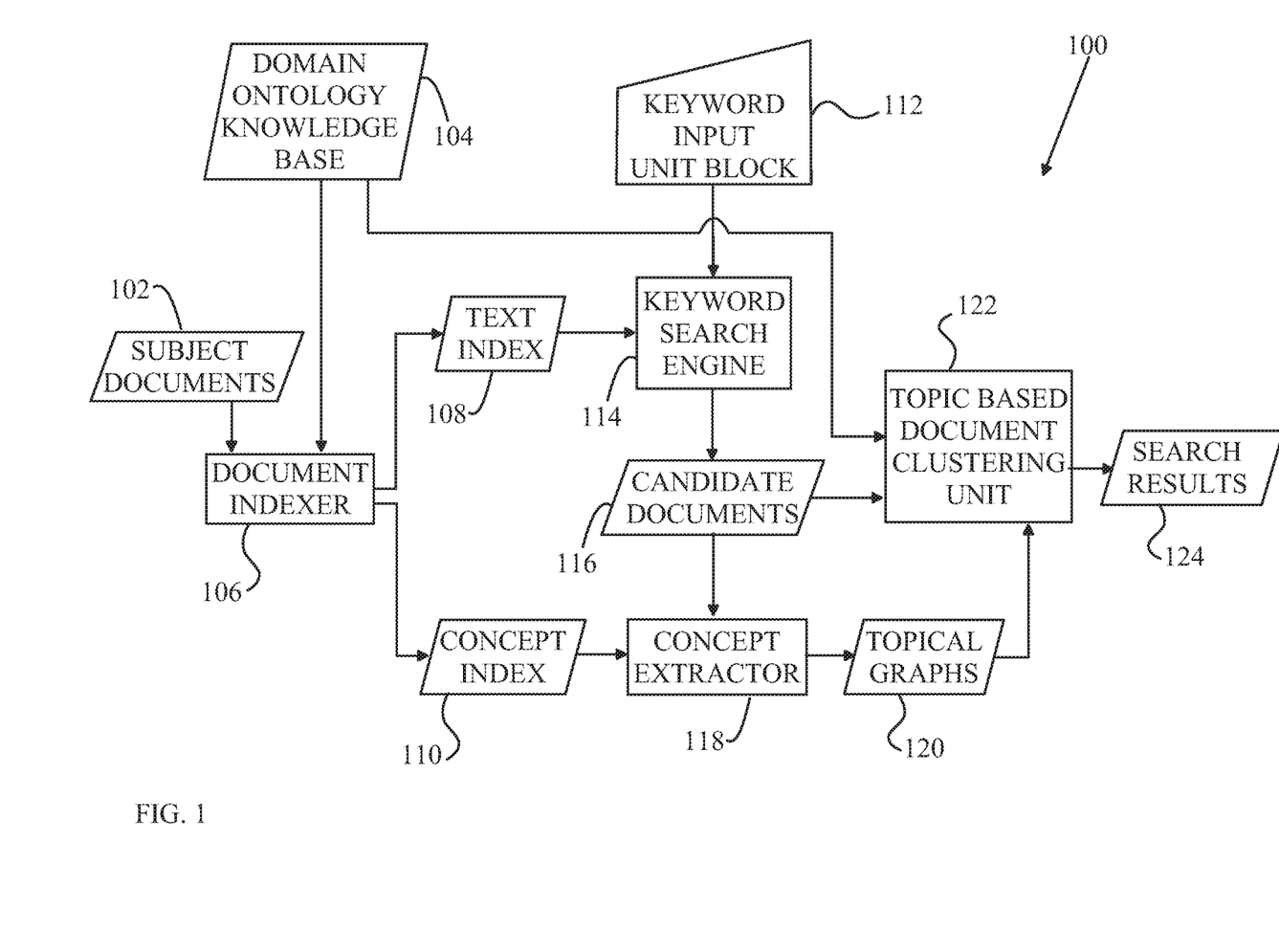
FIG. 1 is a block diagram for a search system according to a first embodiment of the present invention.

Refer now to FIG. 1, which is a block diagram for a search system 100 according to a first embodiment of the present invention. In FIG. 1, a rectangular block illustrates a processing operation, a parallelogram block represents data having no particular limitation on a memory or medium, and a keyword input unit block 112 being substantially a rectangle with the top and bottom sides not being parallel is a block representing input based on a manual operation by a user.

Subject documents 102 represent the documents to be subjected to a search of the present embodiment, and can include various program-type and non-program-type documents containing searchable text information. Examples of such documents are programs, applications, manuals, and application notes. The documents can be located on the measuring apparatus to which the present embodiment is installed or on a network that is accessible to the measuring apparatus. The network may include the internet.

Domain ontology knowledge database 104 is an ontology knowledge database relating to a specific field, which is provided in advance, and is a data block in which data is accumulated as a ontology dictionary regarding concepts in a specialized field relating to measurement functions of the measuring apparatus to which the present embodiment is installed. As described later, the domain ontology knowledge database 104 can include, for example, various terms, namely, concepts relating to the measurement conducted by the measuring apparatus, descriptions of other concepts relevant to each of those concepts, and descriptions for identifying their relationships. For example, the relationships between the concepts can include a generic concept, a specific concept, a concept that is part-of or an attribute-of another concept, a concept that is a synonym for another concept, whole and part of the whole, problem and solution relationship, and other such relationships. As noted above, the ontology knowledge database also includes the concept keywords and their relationships to the various concepts.

The domain ontology knowledge database 104 can be described in an ontology language, for example, web ontology language (OWL), resource description framework (RDF). RDF schema (RDF-S), or Hozo, and is, for example, created in advance and provided by a provider of the present embodiment.

In the domain ontology knowledge database 104, the relevance between a measurement algorithm and its partial concept, relevance between the measurement algorithm and a concept of a generalized measurement problem, relevance between the measurement algorithm and the type of a device to be measured, and other such types of relevance are defined.

The domain ontology knowledge database 104 can include, as the kinds of relationships between the concepts, at least a relationship of a solution indicating that a given concept is solved by another concept, a relationship of siblings indicating that a plurality of concepts have at least one common and generic concept, and a part-of relationship indicating that a given concept and another concept possess each other or are possessed by each other.

Document indexer 106 generates a text index 108 from subject documents 102, and generates a concept index 110 from the subject documents 102 and ontology knowledge database 104. The text index 108 can include a correspondence relationship among a term contained in each of the documents within subject documents 102, a document identifier (document ID) indicating which document contains the term, an appearance location within the document used for displaying the term in the search results, and the like. Concept index 110 can include a relationships between the concept included in the selected documents. The selected concepts are determined from domain ontology knowledge database 104. The concept index includes a document ID indicating the document containing the concept, an appearance location of the concept obtained when the concept appears in the document, and the like.

The processing of document indexer 106 is preferably performed when a new document or documents are added to the document library. The processing can also be carried out periodically, for example, once a day, or before a keyword search is conducted.

The user inputs a keyword to be a search keyword through a manual operation or the like at the keyword input unit block 112. Subsequently, a keyword search engine 114 generates candidate documents 116 indicating a set of document IDs containing the received keyword as character information from the received keyword and the text index 108 described above.

A concept extractor 118 outputs the set of concepts contained in the document IDs included in the candidate documents 116 and their mutual relationships to topical graphs 120 as graph data after the keyword search is completed. The topical graphs 120 can express a concept as a node, connect the related concepts to each other by an edge, define the kinds of relationships between concepts as the kind of edge, and define strength of degree of similarity between the concepts by the weight of the edge. The strength of the degree of similarity between the concepts can be calculated based on the kinds of attributes indicating the relationship between the concepts, which is described in ontology knowledge database 104.

Subsequently, a topic-based document clustering unit 122 classifies the graph data within the topical graphs 120 into a plurality of clusters. Typically, a node is connected to another node by an edge that specifies the relationship between the two nodes and a weight which measures the strength of the connection. The inverse of the weight can be viewed as a "distance" between the two nodes. Consider two nodes that are connected by a third node. The distance between the two nodes can be represented by the inverse of the product of the distance between the first node and the third node and the distance between the second node and the third node. Given a set of nodes and a distance defined between pairs of nodes, there are a number of clustering algorithms that can be used to define clusters of nodes. For example, a cluster can be defined to be a group of nodes that are closer to each other than the nodes are to the other nodes in the graph.

Figure 2:
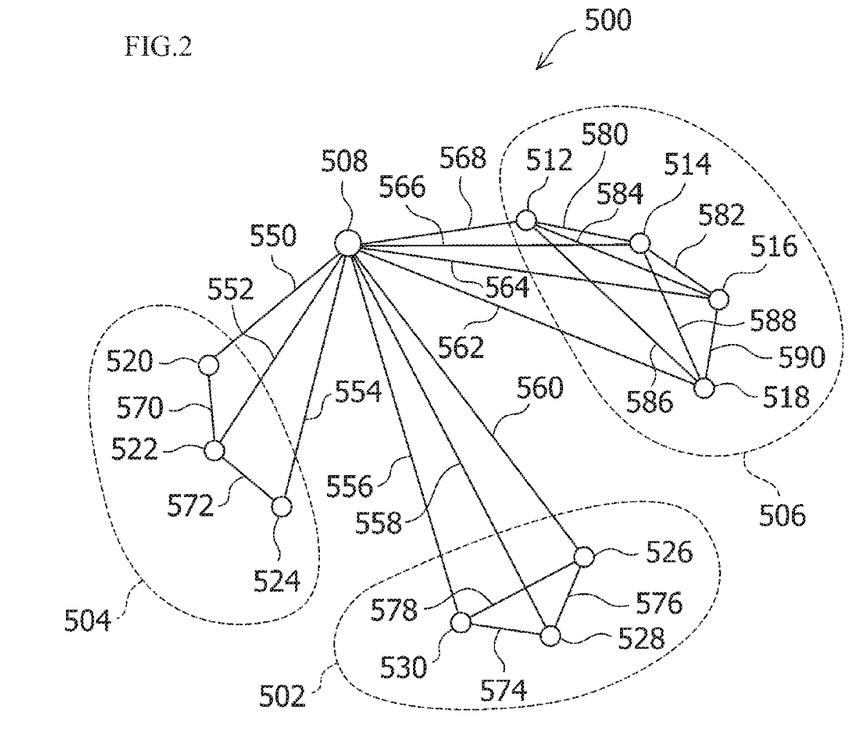
FIG. 2 illustrates a graph generated from an ontology knowledge database for the concepts included in the selected documents.

Refer now to FIG. 2, which illustrates a graph 500 generated from an ontology knowledge database 104 for the concepts included in the selected documents. The graph is a sub-set of the concepts included in ontology knowledge database 104. Circles 508 and 512 to 530 each indicate a node, and a concept is assigned to each node. The reference numbers of the respective nodes and the assigned concepts are shown in Table I. As described above, the related nodes are connected to each other by an edge, and the edge includes a kind and a weight. In Table 2, the kind and the weight assigned to the respective edges are shown. The kind of each edge, that is, the kind of relationship between concepts, is derived from the domain ontology knowledge database 104 through the concept index 110. The weights and type of edges for the nodes shown in FIG. 2, are given in Table II.

TABLE 1

Node and Concept Name

| Reference number of node | Concept name |
| --- | --- |
| 508 | vth measurement |
| 512 | linear search |
| 514 | linear search start gate voltage |
| 516 | linear search stop gate voltage |
| 518 | linear search step gate voltage |
| 520 | fixed Id linear extrapolation |
| 522 | fixed Id vth gate voltage limit |
| 524 | fixed Id vth specified drain |
| 526 | binary search vmin |
| 528 | binary search vmax |
| 530 | binary search |

TABLE 2

Kind and Weight of Each Edge

| Reference number of edge | Kind | weight |
| --- | --- | --- |
| 550 | solution | 0.04 |
| 552 | solution | 0.09 |
| 554 | solution | 0.07 |
| 556 | solution | 0.04 |
| 558 | solution | 0.04 |
| 560 | solution | 0.04 |
| 562 | solution | 0.12 |
| 564 | solution | 0.12 |
| 566 | solution | 0.12 |
| 568 | solution | 0.12 |
| 570 | siblings | 0.42 |
| 572 | siblings | 0.78 |
| 574 | part-of | 1.00 |
| 576 | siblings | 1.00 |
| 578 | part-of | 1.00 |
| 580 | part-of | 0.46 |
| 582 | siblings | 1.00 |
| 584 | part-of | 0.46 |
| 586 | part-of | 0.46 |
| 588 | siblings | 1.00 |
| 590 | siblings | 1.00 |

In this example, the topic-based document clustering unit 122 classifies, for example, the nodes shown in FIG. 2 into a plurality of clusters 502, 504, and 506 based on the degree of similarity between the concepts by the clustering method. In the example, the above-mentioned circles 512 and 514 are classified into the cluster 506, and the node 526 is classified into the cluster 502. Depending on the results of the classification, there exists a node remaining as an independent node that does not belong to any cluster as shown by the circle 508.

Subsequently, the topic-based document clustering unit 122 selects the concept suitable for the label of each cluster by searching the concepts corresponding to the respective nodes belonging to each cluster of the topical graphs 120 for a common ancestor between the concepts based on the kind of relationship between the concepts through the use of ontology knowledge database 104. Alternatively, when the common ancestor to all the nodes, namely, concepts, within each cluster fails to be determined as one concept, the topic-based document clustering unit 122 selects an optimal concept by selecting the concept of the ancestor common to the largest number of concepts. The topic-based document clustering unit 122 thus determines the label of each cluster.

As a result, for example, in FIG. 2, the concept of the circle 512 is selected as the optimal label of the cluster 506 from among a plurality of nodes, namely, a plurality of concepts, contained in the cluster 506.

Subsequently, the topic-based document clustering unit 122 selects an optimal concept by selecting the concept suitable for the label of each cluster from among the concepts corresponding to the respective nodes belonging to each cluster of the topical graphs 120 based on the relationship with another relevant concept and the strength of the degree of similarity. The topic-based document clustering unit 122 thus determines the label of each cluster. For example, two kinds of degrees of similarity of 1.00 and 0.46 appear in the cluster 506. The degree of similarity of 1.00, namely, a strong connection, is based on the fact that those concepts are concepts of the same kind belonging to the same concept and are expected to always appear at the same time. The degree of similarity of 0.46, namely, a relatively weak connection, is based on the possessive (part-of) relationship between the concepts. In this case, the topic-based document clustering unit 122 refers to the domain ontology knowledge database 104 to trace the part-of relationships, to thereby be able to obtain the common ancestor. When the label is to be selected, it is expected not only to simply identify a central concept based on the strength of the similarity (for example, the method of Document 1) but also to obtain a concept that summarizes the topic more abstractly. Such a concept can be obtained by tracing the common ancestor for the concepts within the topic.

Therefore, in this case, the topic-based document clustering unit 122 first extracts only the part-of relationships between the respective concepts, and employs the common ancestor within those relationships as the label. Subsequently, when the common ancestor fails to be determined as one concept, the relative strength of the similarity is also taken into consideration. As a result, in the example of the cluster 506, the topic-based document clustering unit 122 determines the concept "linear search" being the common ancestor as the label of the cluster 506.

With the above-mentioned function, according to the present invention, the document IDs of the subjects for the search can be classified into a plurality of clusters, and then, as the grounds for the labeling, not only a vertical parent-child relationship between concepts on the ontology, but also a lateral relationship between the concepts can be used for the labeling, which enables flexible labeling that matches the user context. Therefore, a keyword particularly useful for the user can be further extracted from the ontology knowledge database 104 and displayed after having an ontology structure removed.

In addition, the topic-based document clustering unit 122 creates, for each cluster, a list of the documents belonging to the cluster, and outputs the list as topically-sorted search results 124.

As described above, the topic-based document clustering unit 122 has features of being capable of: (1) classifying and organizing various subject documents into groups (clusters) that are semantically reasonable from the user's viewpoint as much as possible based on the ontology knowledge database; and (2) assigning an appropriate name (label) that allows the user to instantaneously understand and grasp the meaning to the found group.

Figure 3A:
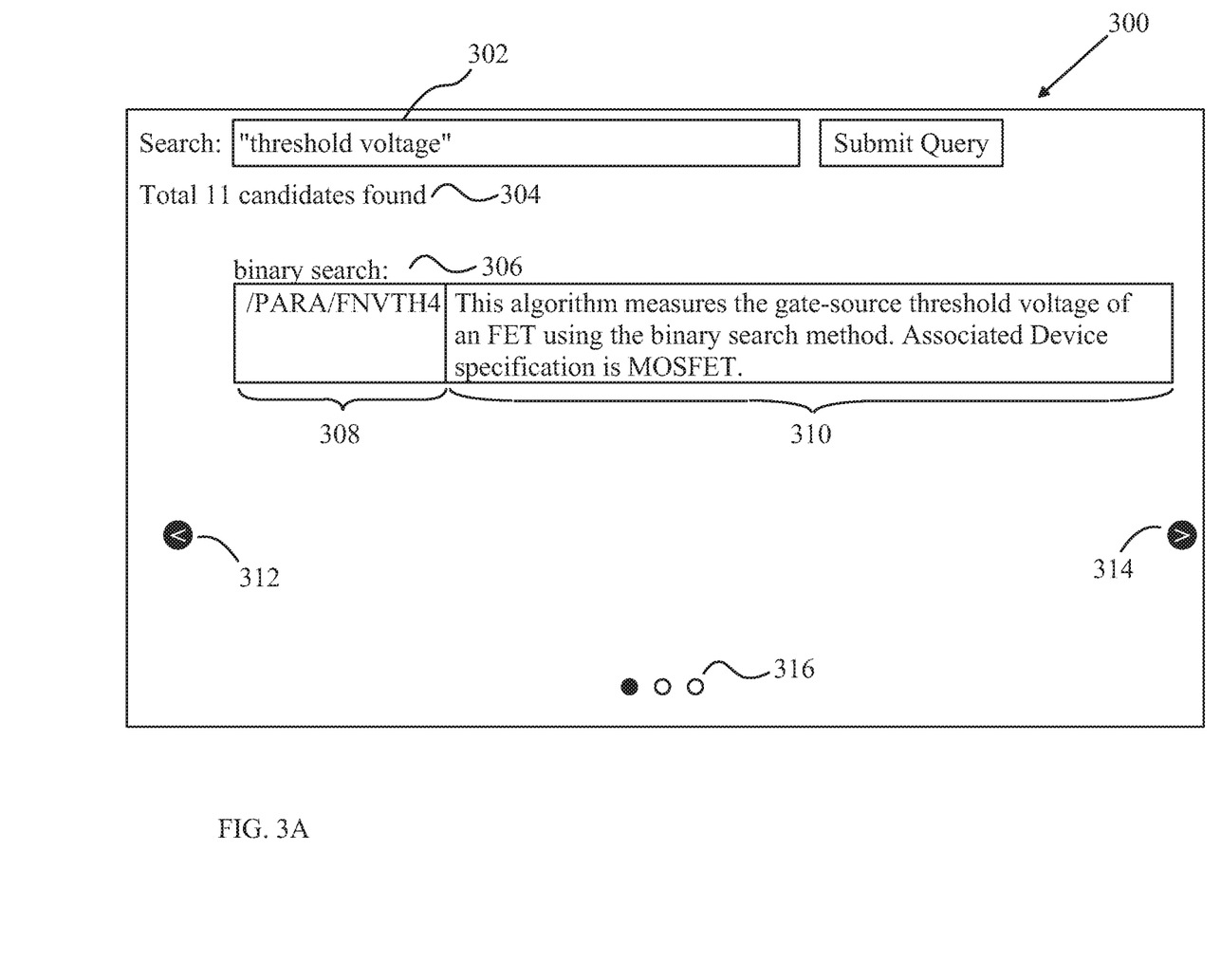
FIGS. 3A-3C illustrate an example of an output display of the topically-sorted search results.
Figure 3B:
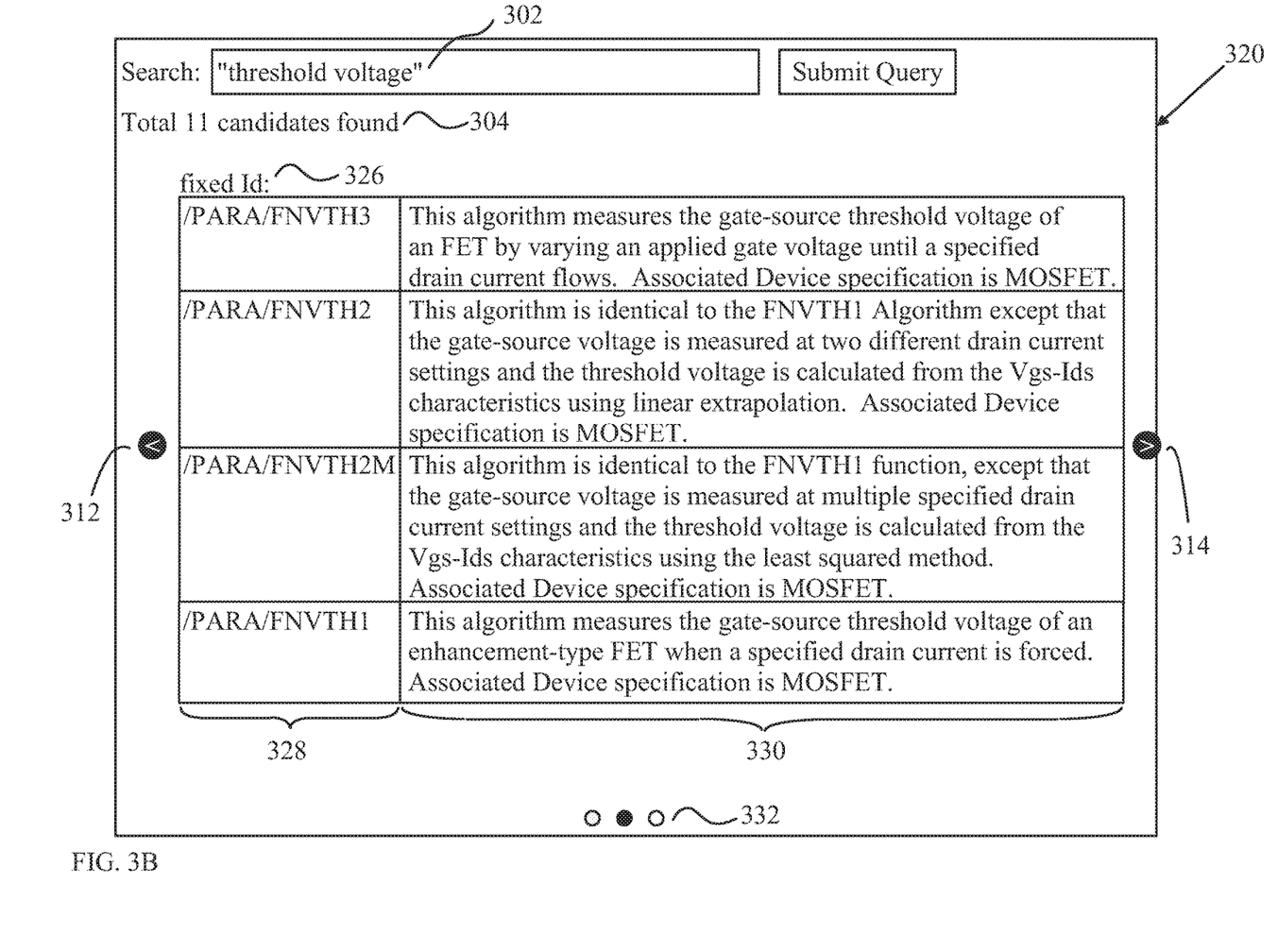
Figure 3C:
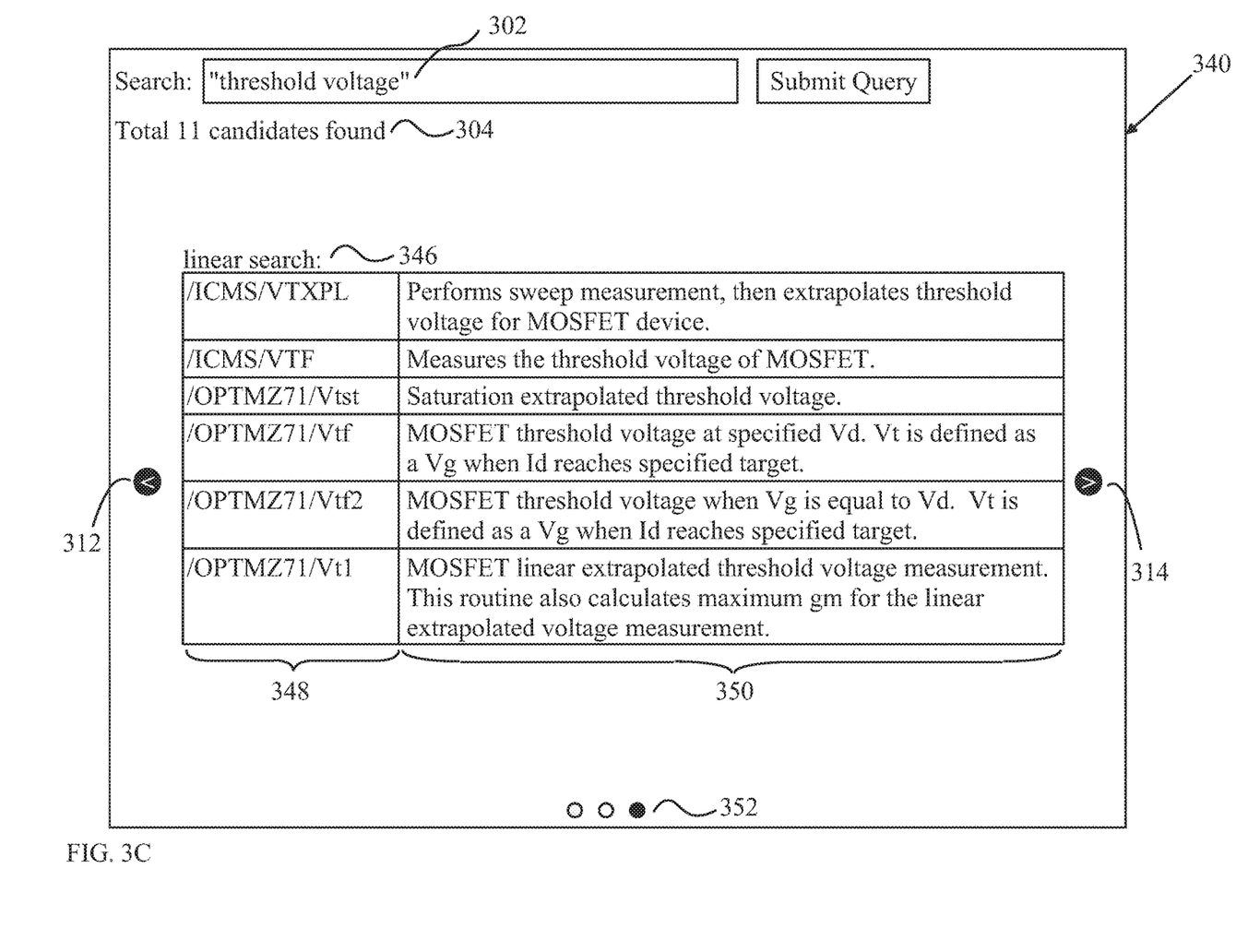

Refer now to FIGS. 3A-3C, which illustrate an example of an output display of the topically-sorted search results 124. FIG. 3A is an illustration of a first screen 300 of the topically-sorted search results 124. In FIG. 3A, "threshold voltage" is displayed in a field 302 as an input keyword, and it is indicated in a status indicator 304 that 11 candidates have been hit as a result of the input. It is indicated in a cluster label line 306 that the cluster name is "binary search". As a document belonging to the above-mentioned cluster, a file name of the document is displayed in a first column 308, and a descriptive text of the document is displayed in a second column 310. Buttons 312 and 314 are buttons used for transition to the previous page or the next page, and an indicator 316 is information on a display position indicating that the page being currently displayed is the first page of three pages.

With the above-mentioned display, the user can understand that contents displayed in columns 308 and 310 belong to the concept "binary search", and can instantaneously judge whether to move the display to the next page without reading the details of the columns 308 and 310. Therefore, the user can efficiently understand the search results and conduct work.

Refer now to FIG. 3B, which is an illustration of a second screen 320 of the topically-sorted search results 124, and display elements having the same function and the same content as those of FIG. 3A are denoted by the same reference numerals as those of FIG. 3A. It is indicated in a cluster label line 326 that the cluster name is "fixed Id". As documents belonging to the above-mentioned cluster, file names of the documents are displayed in a first column 328, and descriptive texts of the documents are displayed in a second column 330. Four documents are listed in total. An indicator 332 indicates that the page currently being displayed is the second page of three pages.

Refer now to FIG. 3C, which is an illustration of a third screen 340 of the topically-sorted search results 124, and display elements having the same function and the same content as those of FIG. 3A are denoted by the same reference numerals as those of FIG. 3A. It is indicated in a cluster label line 346 that the cluster name is "linear search". As documents belonging to the above-mentioned cluster, file names of the documents are displayed in a first column 348, and descriptive texts of the documents are displayed in a second column 350. Six documents are listed in total. An indicator 352 indicates that the page currently being displayed is the third page of three pages.

As illustrated in FIGS. 3A-3B, in the output display of the topically-sorted search results 124 according to the present embodiment, the search results (in this case, 11 results in total) are selectively displayed for each of the clusters obtained through the classification, and a concept name of each cluster is also displayed, which allows the user to efficiently select a candidate having detailed descriptions or contents to be viewed.

Figure 4A:
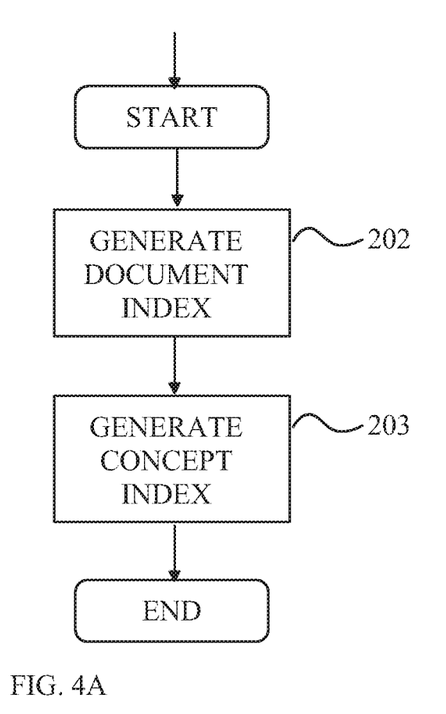
FIGS. 4A-4B are flow charts of the processing performed by the search system shown in FIG. 1.
Figure 4B:
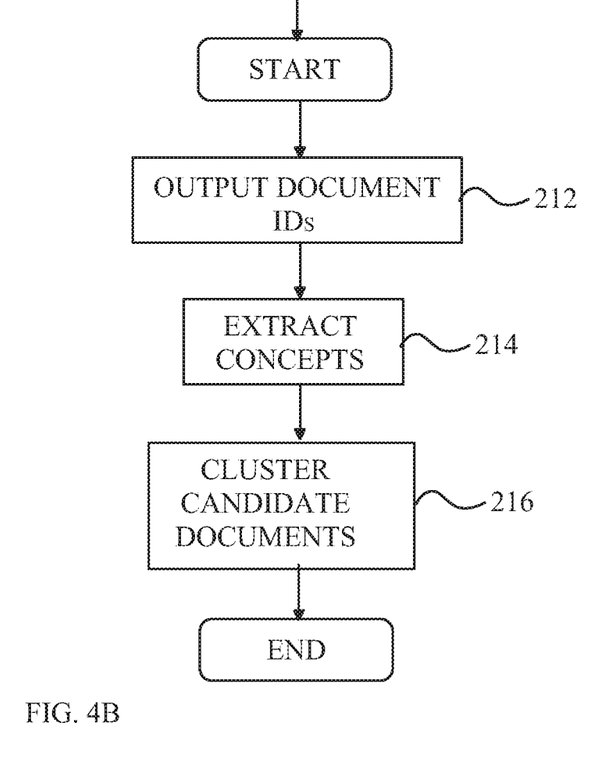

Refer now to FIGS. 4A-4B, which are flow charts of the processing performed by the search system shown in FIG. 1. Referring to FIG. 4A, the system creates two pieces of index data using document indexer 106. When the processing is started, in Step 202, the document indexer 106 generates the text index 108. Next the concept index 110 is created from subject documents 102 and ontology knowledge database 104 as shown at 203, and brings the processing to an end.

Refer now to FIG. 4B which is a flow chart of the processing provided by keyword search engine 114, the concept extractor 118, and the topic-based document clustering unit 122. When the processing is started, keyword search engine 114 outputs the document IDs 212 relating to the keyword of the subject documents from the keyword input unit block 112 and the text index 108 to the candidate documents 116 as shown at 212. Next, concept extractor 214 extracts the concepts relating to the document IDs of the subject documents relating to the input keyword from cluster candidate documents 216 and concept index 110, generates the kind of relationship between the concepts and the degree of similarity as weighted graph data, and outputs the weighted graph data to topical graphs 120 as shown at 214.

Finally, topic-based document clustering unit 122 subjects data in topical graphs 120 to clustering processing, classifies the document IDs indicated by the candidate documents 116 into respective clusters, selects an optimal concept from the concepts within topical graphs 120 for labeling each of the clusters, outputs a list of documents relating to the keyword for each of the labeled clusters to the topically-sorted search results 124 as shown at 216, and brings the processing to an end.

While the above-described embodiments allow the user to search with a broad query, the search results are limited by the words chosen by the user whose vocabulary may differ from that of the authors of the documents in the library. In one aspect of the invention, the concept keywords can be used to broaden the search. Consider the case in which one of the search keywords elicits a particular concept. That concept has attached to it a list of concept keywords that are included in the library documents. An embodiment of the present invention, the user can broaden the search to include one or more of the concept keywords attached to the concepts that were found by the original search in a new search as alternatives for the keyword originally chosen by the user. Here, the system will present the user with a list of the concept keywords connected directly to concepts that were elicited by the current search.

Figure 5:
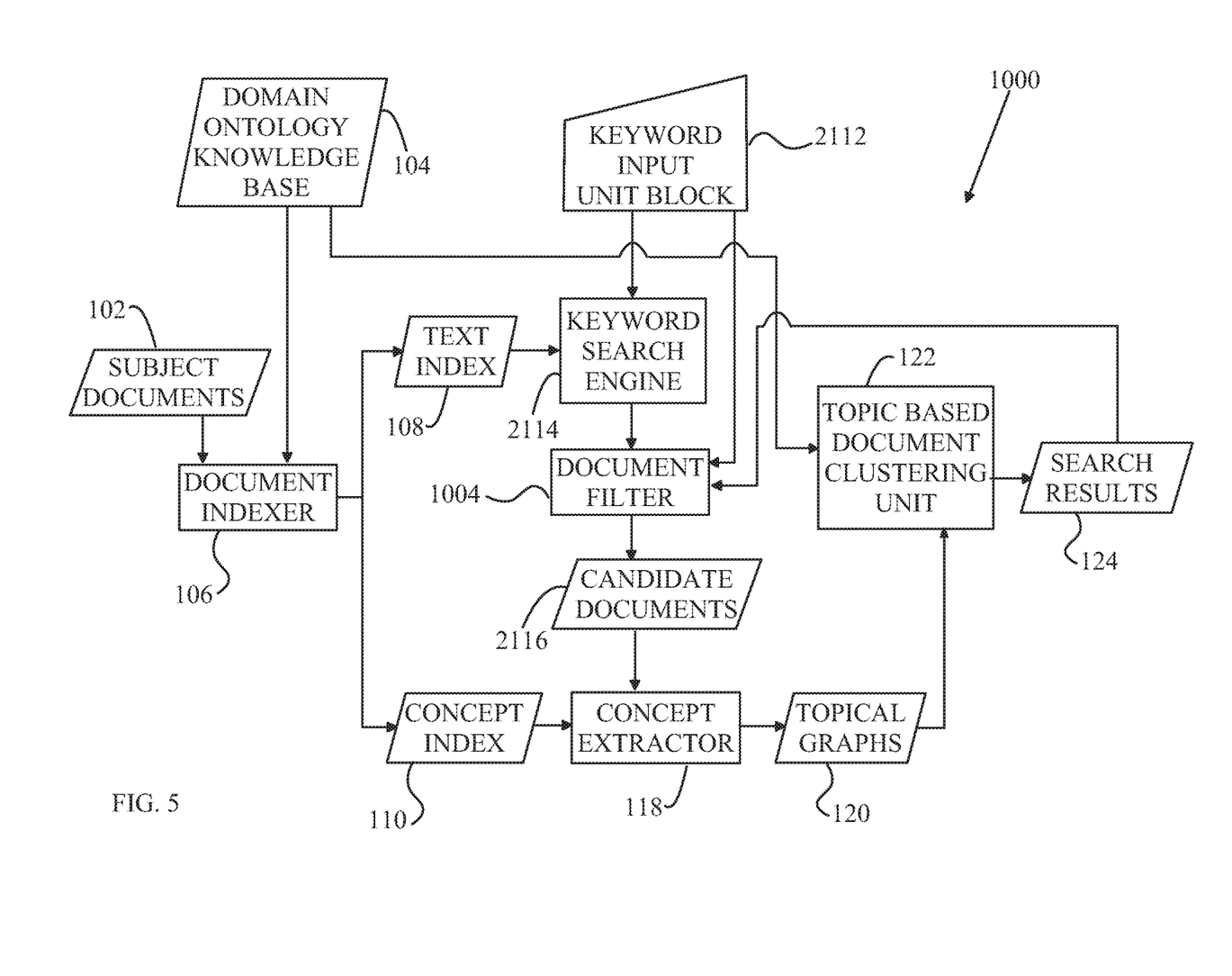
FIG. 5 illustrates a search system according to another embodiment of the present invention.

In another aspect of the invention, the processing can be refined by specifying keywords for use in selecting concepts from the topical graphs to be used in displaying the search results. Refer now to FIG. 5, which illustrates a search system according to another embodiment of the present invention. FIG. 5 is a block diagram of a search system 1000. The differences between the meanings of the blocks depending on their shape are the same as those of FIG. 1, and a block having the same function as that of FIG. 1 is denoted by the same numeric reference.

In this embodiment, through the use of a keyword input unit 2112, the user can specify restrictions on the cluster name to be subjected to a refined search as an option in addition to the normal keyword input. When the refined search is executed by specifying the cluster name within the search results in addition to the previously input keyword, the concepts contained in the specified cluster are further clustered into a plurality of sub-clusters, each of the sub-clusters is labeled by the same method as that of the first embodiment. Documents belonging to a sub-cluster within the specified cluster are listed for each of the sub-clusters as updated search results, and the list is output as the topically-sorted search results 124.

For example, "threshold voltage"+/linear search/ can be input to the keyword input unit 2112. Here, "+" represents a logical AND operator and "/" is a delimiter for specifying the cluster name being a subject for a search used when the refined search is further conducted. Keyword search engine 2114 is configured to use only a normal keyword within the contents input through keyword input unit 2112 to generate the set of document IDs containing the keyword as the character information from the text index 108, and to output the set of document IDs to a newly provided document filter 1004. Document filter 1004 is configured to determine whether or not the cluster name for a refined search is contained in the contents input through keyword input unit 2112. When the cluster name is contained, document filter 1004 refers to the contents of the topically-sorted search results 124 being the previous search results to pass only the document IDs belonging to the specified cluster among the document IDs received from the keyword search engine 2114, and outputs the passed document IDs to the candidate documents 2116. When the cluster name for a refined search is not contained in the contents input through keyword input unit 2112, document filter 1004 passes all the document IDs received from keyword search engine 2114, and outputs the passed document IDs to candidate documents 2116.

The other functions and operations of search system 1000 are the same as those of search system 100 discussed above. In this manner, the user can further advance the search repeatedly through the use of the previous search results by specifying the cluster name to be used for the refinement in addition to the previous search keyword displayed in the keyword input unit 2112 and repeating the processing. Therefore, the incremental refinement of the search can be achieved.

Figure 6:
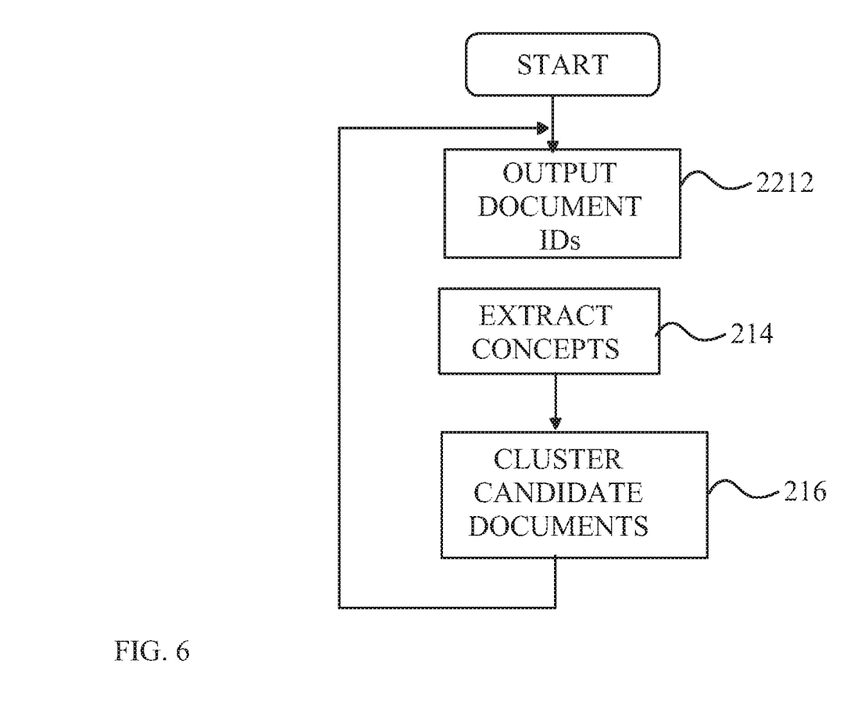
FIG. 6 is a flow chart for the processing of the search system corresponding to FIG. 4B.

Refer now to FIG. 6, which is a flow chart for the processing of search system 1000 corresponding to FIG. 4B discussed above. The operation relating to the document indexer 106 of FIG. 4A is the same in the second embodiment, and hence a description thereof is omitted. Further, in FIG. 6, the steps for the same operations as those of FIG. 4B are denoted by the same reference numerals.

In FIG. 6, when the processing is started, first, the keyword search engine 2114 outputs the document IDs relating to the keyword within the subject documents from the normal keyword part of the keyword input unit 2112 and the text index 108 to the document filter 1004 as shown at 2212. Subsequently, the document filter 1004 determines whether or not the cluster name for the refined search is contained in the contents input through the keyword input unit 2112. When the cluster name is contained, the document filter 1004 refers to the contents of the topically-sorted search results 124 to pass only the document IDs belonging to the specified cluster, and outputs the passed document IDs to the candidate documents 2116. When the cluster name for the refined search is not contained, the document filter 1004 passes all the document IDs received from the keyword search engine 2114, and outputs the passed document IDs to the candidate documents 2116. Subsequently, Steps 214 and 216 that are the same as those of FIG. 4B are executed, and then the procedure returns to Step 2212 to repeat Steps 2212, 214, and 216 based on the updated input from the keyword input unit 2112.

Figure 7A:
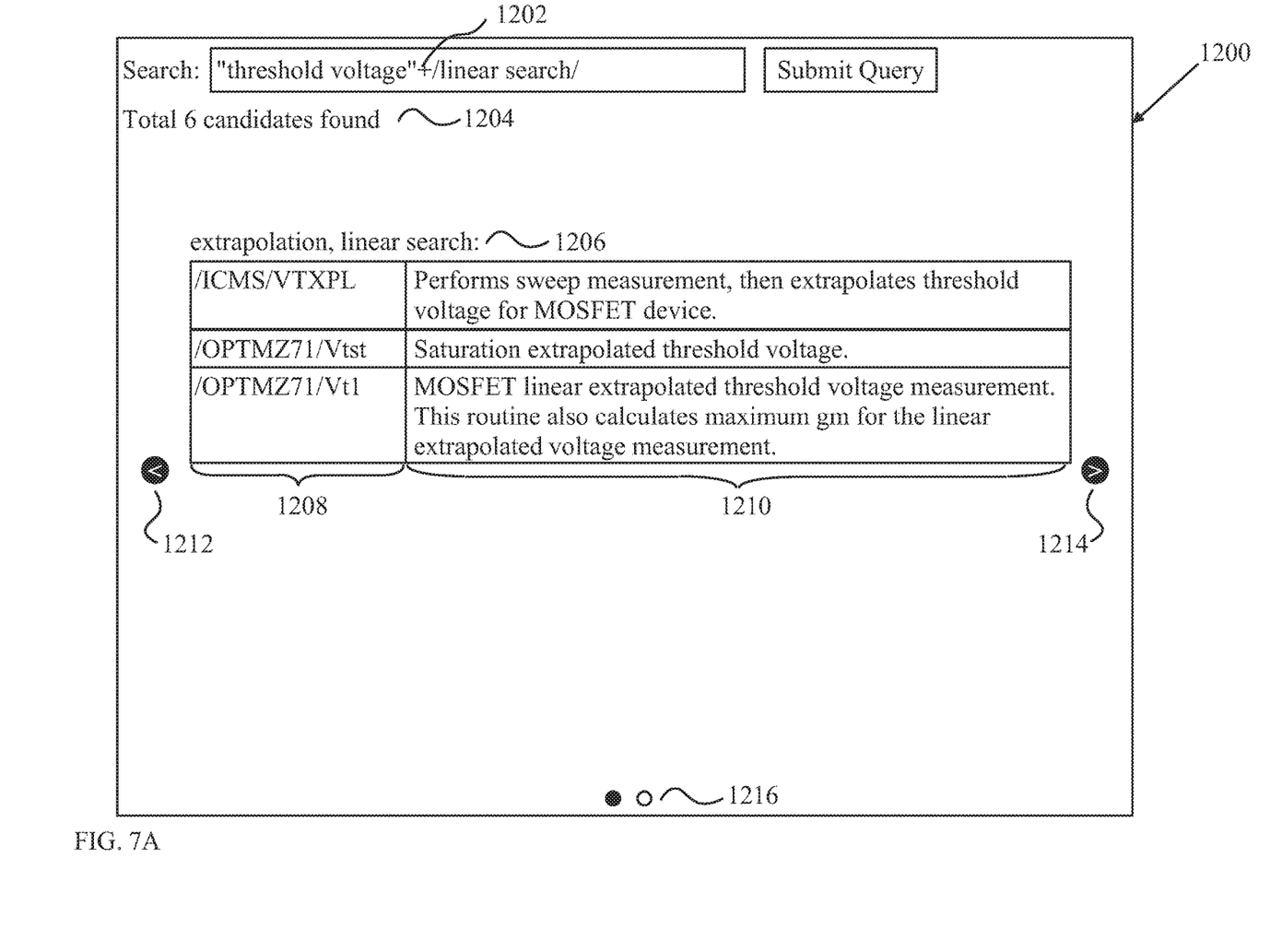
FIGS. 7A-7B illustrate an example of an output display of the topically-sorted search results according to the second embodiment.

Refer now to FIGS. 7A and 7B, which illustrate an example of an output display of the topically-sorted search results 124 according to the second embodiment. First, FIG. 7A is an illustration of a first screen 1200 of the topically-sorted search results 124 according to the second embodiment. In FIG. 7A. "threshold voltage"+/linear search/ is displayed in a field 1202 as an input keyword, and the cluster "linear search" is specified for the refinement in addition to the previous search keyword. It is indicated in a status indicator 1204 that six candidates have been hit as a result of the processing regarding the new input. In a cluster label line 1206, the cluster name is displayed as "extrapolation, linear search", which indicates that the display relates to the sub-cluster "extrapolation" under the cluster "linear search". As the documents belonging to the above-mentioned sub-cluster, file names of the documents are displayed in a first column 1208, and descriptive texts of the documents are displayed in a second column 1210. Three documents are listed in total. Buttons 1212 and 1214 and an indicator 1216 are the same as the corresponding buttons 312 and 314 and the corresponding indicator 316 of FIG. 3A, and hence descriptions thereof are omitted. The above-mentioned display allows the user to understand that the contents displayed in the columns 1208 and 1210 belong to the concept of the sub-cluster "extrapolation" under the cluster "linear search" and that the results have been obtained by subjecting the search results of FIGS. 3A to 3C to the refined search regarding the cluster "linear search". Therefore, the user can efficiently understand the incrementally refined search results to conduct work.

Figure 7B:
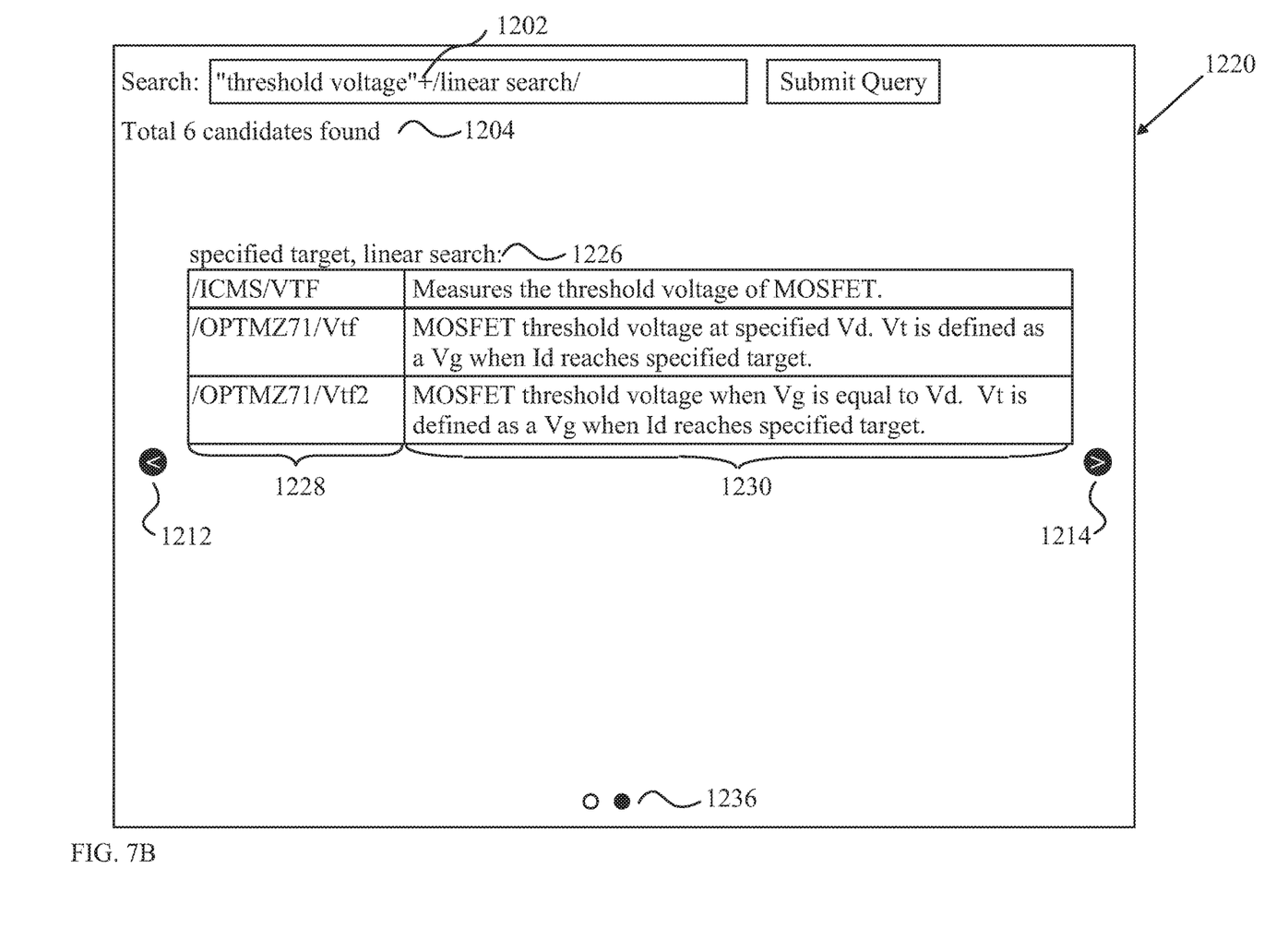

Refer now to FIG. 7B, which illustrates a second screen 1220 of the topically-sorted search results 124 according to the second embodiment, and a display element having the same function and the same content as those of FIG. 7A is denoted by the same reference numeral as that of FIG. 7A. In a cluster label line 1226, the cluster name is displayed as "specified target, linear search". As the documents belonging to the above-mentioned cluster, file names of the documents are displayed in a first column 1228, and descriptive texts of the documents are displayed in a second column 1230. Three documents are listed in total. An indicator 1236 indicates that the page being currently displayed is the second page of two pages.

In the above-described embodiments, a concept index is created that includes the relationships between the concepts contained in the selected documents. This index is created from the ontology knowledge database 104. These relationships can be copied from the ontology knowledge database 104. Alternatively, the concept index can include pointers to locations in the ontology knowledge database 104 at which the relationship information in question is located.

The embodiments described above can be implemented on a controller mounted on an electronic measuring apparatus, which includes a processor, various kinds of memory, an ASIC, and an FPGA and is capable of executing a program. In another case, the first embodiment can be implemented on a computer, for example, a PC, which is connected to the outside of the electronic measuring apparatus, includes a processor, various kinds of memory, an ASIC, and an FPGA to be capable of executing a program, or has installed thereon one of various OSs including Windows (trademark) and Linux (trademark).

The present invention also includes computer readable media that store code that will cause a computer to execute the method of the present invention and, optionally, stores one or both of the databases discussed above. For example, the computer readable media could include the ontology knowledge database 104 as well as the code for executing the method of the present invention. In one exemplary embodiment, the ontology knowledge database includes the concept keywords, but not the locations in the document library. Prior to performing a keyword search, a search engine creates the concept index by finding the locations of the concept keywords in the current library. This embodiment allows the ontology knowledge database 104 directed to a specialized field to be provided with a search engine according to the present invention to a user who has assembled his or her own document library.

In another embodiment, the library is included by the entity that provides the program and ontology knowledge database 104. The library could be on a separate computer readable medium, available over the Internet. or on the same computer readable medium as the program and ontology knowledge database 104.

For the purposes of the present discussion, a computer readable medium is defined to be any medium that constitutes patentable subject matter under 35 U.S.C. 101 and excludes any media that is not patentable subject matter under 35 U.S.C. 101. Examples of such media are non-transitory media such as computer disks and non-volatile memories.

The above-described embodiments of the present invention have been provided to illustrate various aspects of the invention. However, it is to be understood that different aspects of the present invention that are shown in different specific embodiments can be combined to provide other embodiments of the present invention. In addition, various modifications to the present invention will become apparent from the foregoing description and accompanying drawings. Accordingly, the present invention is to be limited solely by the scope of the following claims.

What is claimed is:

1. A method for operating a data processing system to identify documents in a library comprising a plurality of documents and a plurality of concepts exemplified by said plurality of documents, said method comprising:
   providing a concept database that associates concepts in a particular field to which said plurality of documents relates;
   providing access to said library, each document in said library further comprising a concept index indicating concepts from said concept database that are included in that document;
   causing said data processing system to identify candidate documents matching a user provided search keyword from said library;
   causing said data processing system to generate a topical graph relating two or more of said plurality of concepts contained in said concept indices of said candidate documents to one another;
   clustering said candidate documents based on said topical graph; and
   for each cluster, displaying a summary of said candidate documents in that cluster together with a cluster name that characterizes that cluster.

2. The method of claim 1 further comprising causing said data processing system to generate a text index specifying a location in each of said plurality of documents of each candidate search keyword in said library.

3. The method of claim 1 further comprising causing said data processing system to generate said concept index, said concept index specifying a location for each of said one or more of said plurality of concepts in said plurality of documents and a relationship between that concept and another one of said concepts in said plurality of documents.

4. The method of claim 3 wherein said concept index further comprises a weight specifying a strength of said relationship between that document and said another one of said concepts.

5. The method of claim 3 wherein said relationships comprise a parent-child, generic concept-specific concept, a concept that is part-of or an attribute-of another concept, a concept that is a synonym for another concept, whole and part of the whole, and a problem and solution relationship.

6. The method of claim 3 wherein said relationships comprise a concept keyword relationship associating a concept keyword in one of said documents with one of said concepts.

7. The method of claim 3 wherein each of said concepts in said topical graph includes a concept name describing that concept and wherein said cluster name is said concept name of one of said concepts included in said candidate documents in said cluster.

8. The method of claim 3 wherein said concept index is derived from an ontology knowledge database.

9. The method of claim 1 wherein said concept name for one of said clusters comprises a name of a parent concept common to two of said concepts within that one of said clusters.

10. The method of claim 1 wherein said concept name for one of said clusters comprises a name of a parent concept common to a majority of said concepts within that one of said clusters.

11. The method of claim 1 wherein said concept name is a name common to all concepts in one of said clusters.

12. The method of claim 1 further comprising receiving one of said cluster names from said user and another search keyword and causing said data processing system to generate candidate documents representing one of said plurality of documents belonging to that one of said cluster names and previously selected documents that satisfy said another search keyword.

13. The method of claim 7 wherein each concept in said topical graph comprises a list of concept keywords associated with that concept and wherein said data processing system displays said concept keywords associated with said concept corresponding to said cluster name when said summary of said candidate documents is displayed.

14. The method of claim 13 wherein said data processing system performs another search of said documents using one of said displayed concepts keywords in addition to said search keyword in response to a user selecting one of said concept keywords.

15. A computer readable medium having instructions that cause a data processing system to execute a search method when said instructions are loaded into a processor on said data processing system, said search method identifying documents in a library comprising a plurality of documents and a plurality of concepts exemplified by said plurality of documents, said search method comprising:
providing a concept database that associates concepts in a particular field to which said plurality of documents relates;
providing access to said library, each document in said library further comprising a concept index indicating concepts from said concept database that are included in that document;
causing said data processing system to identify candidate documents matching a user provided search keyword from said library;
causing said data processing system to generate a topical graph relating two or more of said plurality of concepts contained in said concept indices of said candidate documents to one another;
clustering said candidate documents based on said topical graph; and
for each cluster, displaying a summary of said candidate documents in that cluster together with a cluster name that characterizes that cluster.

16. The computer readable medium of claim 15 wherein said computer readable medium also stores an ontology database that is used by said data processing system to generate said topical graph from said library.

17. The computer readable medium of claim 16 wherein said library is separate from said computer readable medium.

* * * * *